(12) United States Patent
Smith et al.

(10) Patent No.: US 7,614,672 B2
(45) Date of Patent: *Nov. 10, 2009

(54) LOW PROFILE MECHANICAL ASSIST HOOD LATCH

(75) Inventors: Kelly K. Smith, Spring, TX (US); Karl J. Dobler, Cypress, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/941,832

(22) Filed: Nov. 16, 2007

(65) Prior Publication Data

US 2008/0061563 A1 Mar. 13, 2008

Related U.S. Application Data

(62) Division of application No. 10/431,235, filed on May 7, 2003, now Pat. No. 7,325,846.

(51) Int. Cl.
*E05B 3/00* (2006.01)
*H05K 5/00* (2006.01)

(52) U.S. Cl. .................. 292/336.3; 292/137; 292/143; 292/173; 292/DIG. 11; 312/223.3

(58) Field of Classification Search ............... 292/336.3
See application file for complete search history.

(56) References Cited

U.S. PATENT DOCUMENTS

| | | | |
|---|---|---|---|
| 1,136,498 A | 4/1915 | Tower |
| 2,703,431 A | 3/1955 | Tatom |
| 2,710,214 A | 5/1955 | Mills |
| 2,720,772 A | 10/1955 | Atkinson |
| 2,780,485 A | 2/1957 | Dedoes |
| 2,871,048 A | 1/1959 | Balogh |
| 2,874,986 A | 2/1959 | Henrichs |
| 3,012,805 A | 12/1961 | Poe |
| 3,151,375 A | 10/1964 | Schevenell |
| 3,367,698 A | 2/1968 | Walker |
| 3,488,984 A | 1/1970 | Salonia |
| 3,743,336 A | 7/1973 | Andrews |
| 3,782,141 A | 1/1974 | Doerrfeld |
| 3,896,698 A | 7/1975 | Aylott |
| 3,957,225 A | 5/1976 | Vogel |
| 4,038,718 A | 8/1977 | Reilhac et al. |
| 4,105,234 A | 8/1978 | Eberhart |
| 4,116,027 A | 9/1978 | Tannery |

(Continued)

FOREIGN PATENT DOCUMENTS

WO  WO02099229  12/2002

OTHER PUBLICATIONS

Southco Quotation, Jan. 24, 2002.

(Continued)

*Primary Examiner*—Carlos Lugo (57) ABSTRACT

A mechanical assist apparatus is provided for biasing an access cover relative to a housing. The mechanical assist apparatus comprises a user-engageable lever, an arm rotatably coupled to the user-engageable lever at a first joint, and a sled rotatably coupled to the arm at a second joint offset from the first joint, wherein the sled comprises a biasing member.

13 Claims, 5 Drawing Sheets

U.S. PATENT DOCUMENTS

| | | |
|---|---|---|
| 4,138,869 A | 2/1979 | Pelcin |
| 4,184,705 A | 1/1980 | Little |
| 4,224,650 A | 9/1980 | Ban et al. |
| 4,307,906 A | 12/1981 | Schenk |
| 4,321,812 A | 3/1982 | Pelcin |
| 4,335,595 A | 6/1982 | Swan et al. |
| 4,365,832 A | 12/1982 | Treppler |
| 4,366,686 A | 1/1983 | Remington et al. |
| 4,379,579 A | 4/1983 | Mahan et al. |
| 4,394,548 A | 7/1983 | Dola |
| 4,416,478 A | 11/1983 | Canney |
| 4,428,608 A | 1/1984 | Cooke et al. |
| 4,436,329 A | 3/1984 | Metzger |
| 4,466,680 A | 8/1984 | Sakai et al. |
| 4,494,626 A | 1/1985 | Ast |
| 4,531,769 A | 7/1985 | Glancy |
| 4,548,572 A | 10/1985 | Hoffman |
| 4,554,807 A | 11/1985 | Dolejs |
| 4,580,818 A | 4/1986 | Lyng |
| 4,595,228 A | 6/1986 | Chu |
| 4,618,118 A | 10/1986 | Nardella et al. |
| 4,632,493 A | 12/1986 | Matsuzaki et al. |
| 4,633,348 A | 12/1986 | Takai |
| 4,635,454 A | 1/1987 | Brown |
| 4,683,736 A | 8/1987 | Weinerman et al. |
| 4,704,882 A | 11/1987 | Takasaki |
| 4,707,006 A | 11/1987 | Garg et al. |
| 4,813,143 A | 3/1989 | Scheminger et al. |
| 4,817,979 A | 4/1989 | Goettker |
| 4,828,299 A | 5/1989 | Poe |
| 4,881,699 A | 11/1989 | Emura |
| 4,892,338 A | 1/1990 | Weinerman et al. |
| 4,892,342 A | 1/1990 | Newman et al. |
| 4,925,246 A | 5/1990 | Corcoran |
| 4,931,602 A | 6/1990 | Toda et al. |
| 4,938,520 A | 7/1990 | Shelton |
| 4,942,757 A | 7/1990 | Pecora |
| 4,961,286 A | 10/1990 | Bezubic |
| 4,967,478 A | 11/1990 | Sherman |
| 4,975,673 A | 12/1990 | Ikehata et al. |
| 4,995,652 A | 2/1991 | Mugnoto et al. |
| 5,031,942 A | 7/1991 | Harrod |
| 5,048,877 A | 9/1991 | Rogers, Jr. et al. |
| 5,066,247 A | 11/1991 | Watson |
| 5,183,235 A | 2/1993 | Arzouman et al. |
| 5,189,575 A | 2/1993 | Onooka et al. |
| 5,201,557 A | 4/1993 | Schlack |
| 5,219,354 A | 6/1993 | Choudhury et al. |
| 5,226,834 A | 7/1993 | Kato et al. |
| 5,285,338 A | 2/1994 | Sugahara et al. |
| 5,355,604 A | 10/1994 | Rathke |
| 5,364,282 A | 11/1994 | Tondreault |
| 5,375,894 A | 12/1994 | Schlack |
| 5,410,899 A | 5/1995 | McConnell |
| 5,413,391 A | 5/1995 | Calvin et al. |
| 5,419,167 A | 5/1995 | Yamada et al. |
| 5,433,159 A | 7/1995 | Muramatsu |
| 5,443,224 A | 8/1995 | Patterson et al. |
| 5,443,354 A | 8/1995 | Stone et al. |
| 5,454,485 A | 10/1995 | Dalziel |
| 5,457,295 A | 10/1995 | Tanibe et al. |
| 5,488,661 A | 1/1996 | Matsui |
| 5,526,567 A | 6/1996 | Carson, III et al. |
| 5,553,675 A | 9/1996 | Pitzen et al. |
| 5,555,995 A | 9/1996 | Galer |
| 5,558,527 A | 9/1996 | Lin |
| 5,575,163 A | 11/1996 | Kohl et al. |
| 5,593,220 A | 1/1997 | Seid et al. |
| 5,607,324 A | 3/1997 | Saur et al. |
| 5,619,398 A | 4/1997 | Harrison et al. |
| 5,620,213 A | 4/1997 | Ellis |
| 5,653,525 A | 8/1997 | Park |
| 5,727,675 A | 3/1998 | Leveque et al. |
| 5,740,012 A | 4/1998 | Choi |
| 5,743,606 A | 4/1998 | Scholder |
| 5,779,171 A | 7/1998 | Milano, Jr. et al. |
| 5,788,219 A | 8/1998 | Nakajima |
| 5,803,515 A | 9/1998 | Arabia, Jr. et al. |
| 5,820,175 A | 10/1998 | Calvin |
| 5,882,816 A | 3/1999 | Gotou |
| 5,893,478 A | 4/1999 | Maruoka |
| 5,897,147 A | 4/1999 | Alyanakian et al. |
| 5,901,415 A | 5/1999 | Morrison et al. |
| 5,901,838 A | 5/1999 | Nakatani et al. |
| 5,915,441 A | 6/1999 | Schlack |
| 5,918,956 A | 7/1999 | Scholder |
| 5,938,248 A | 8/1999 | Vickers et al. |
| 5,941,730 A | 8/1999 | Uchiyama et al. |
| 5,956,821 A | 9/1999 | Kurek, III et al. |
| 5,971,801 A | 10/1999 | Kato et al. |
| 5,974,842 A | 11/1999 | Schlack et al. |
| 5,979,691 A | 11/1999 | Von Holdt |
| D417,603 S | 12/1999 | Schlack et al. |
| D418,043 S | 12/1999 | Schlack et al. |
| 5,997,115 A | 12/1999 | Radloff et al. |
| D419,053 S | 1/2000 | Schlack |
| 6,036,509 A | 3/2000 | Maejima |
| RE36,672 E | 4/2000 | Onooka et al. |
| 6,053,586 A | 4/2000 | Cook et al. |
| 6,054,798 A | 4/2000 | Sato et al. |
| D424,405 S | 5/2000 | Schlack et al. |
| D425,396 S | 5/2000 | Schlack et al. |
| D425,775 S | 5/2000 | Schlack et al. |
| 6,129,429 A | 10/2000 | Hardt et al. |
| 6,145,352 A | 11/2000 | Vickers et al. |
| 6,152,497 A | 11/2000 | Vickers et al. |
| 6,152,533 A | 11/2000 | Smuk |
| 6,157,532 A | 12/2000 | Cook et al. |
| 6,158,787 A | 12/2000 | Kutschat |
| 6,163,913 A | 12/2000 | DiSieno et al. |
| 6,167,076 A | 12/2000 | Ignacio |
| 6,174,007 B1 | 1/2001 | Schlack et al. |
| 6,179,350 B1 | 1/2001 | Ely et al. |
| 6,203,076 B1 | 3/2001 | Wytcherley et al. |
| 6,203,077 B1 | 3/2001 | Schlack |
| 6,222,736 B1 | 4/2001 | Sim et al. |
| 6,266,239 B1 | 7/2001 | Cook et al. |
| 6,273,532 B1 | 8/2001 | Chen et al. |
| 6,296,334 B1 | 10/2001 | Liao |
| 6,324,386 B1 | 11/2001 | Headon |
| 6,354,638 B1 | 3/2002 | Hoffmann |
| 6,354,680 B1 | 3/2002 | Lin et al. |
| 6,362,975 B1 | 3/2002 | Liu et al. |
| 6,367,896 B1 | 4/2002 | Peng et al. |
| 6,381,145 B1 | 4/2002 | Chen et al. |
| 6,398,325 B1 | 6/2002 | Chen et al. |
| 6,407,912 B1 | 6/2002 | Chen et al. |
| 6,450,554 B1 | 9/2002 | Rotondi et al. |
| 6,457,788 B1 | 10/2002 | Perez et al. |
| 6,497,437 B1 | 12/2002 | Munch et al. |
| 6,523,870 B2 | 2/2003 | Schlack |
| 6,616,201 B1 | 9/2003 | Liang |
| 6,637,785 B2 | 10/2003 | Sugimoto |
| 6,643,139 B2 | 11/2003 | Tien |
| 6,658,739 B1 | 12/2003 | Huang |
| 6,679,533 B1 | 1/2004 | Bruner et al. |
| 6,721,183 B1 | 4/2004 | Chen et al. |
| 6,798,669 B1 | 9/2004 | Hsu |
| 6,824,174 B2 | 11/2004 | Lin et al. |
| 6,917,518 B2 | 7/2005 | Chen |
| 6,957,979 B2 | 10/2005 | Welsh et al. |
| 2001/0026070 A1 | 10/2001 | Schlack et al. |
| 2002/0117864 A1 | 8/2002 | Schlack |
| 2002/0163201 A1 | 11/2002 | Schlack et al. |

| | | |
|---|---|---|
| 2002/0182896 A1 | 12/2002 | Welsh et al. |
| 2004/0021325 A1 | 2/2004 | Schlack et al. |
| 2006/0103141 A1 | 5/2006 | Schlack |

OTHER PUBLICATIONS

Southco Quotation, Feb. 1, 2002.

LOW PROFILE MECHANICAL ASSIST HOOD LATCH

CROSS-REFERENCE TO RELATED APPLICATION

This is a divisional of co-pending application Ser. No. 10/431,235 filed on May 7, 2003, which is hereby incorporated by reference.

BACKGROUND

Electronic devices, such as computer systems, often have a removable panel or cover to provide access to components and circuitry disposed within a housing. These removable covers are generally coupled to the housing by a threaded fastener, such as a screw, or other tool-based fasteners. Unfortunately, tool-based fasteners involve a considerable amount of time and effort to remove or attach.

BRIEF DESCRIPTION OF THE DRAWINGS

Embodiments will hereafter be described with reference to the accompanying drawings, wherein like reference numerals denote like elements, and.

DETAILED DESCRIPTION

Figure 1:
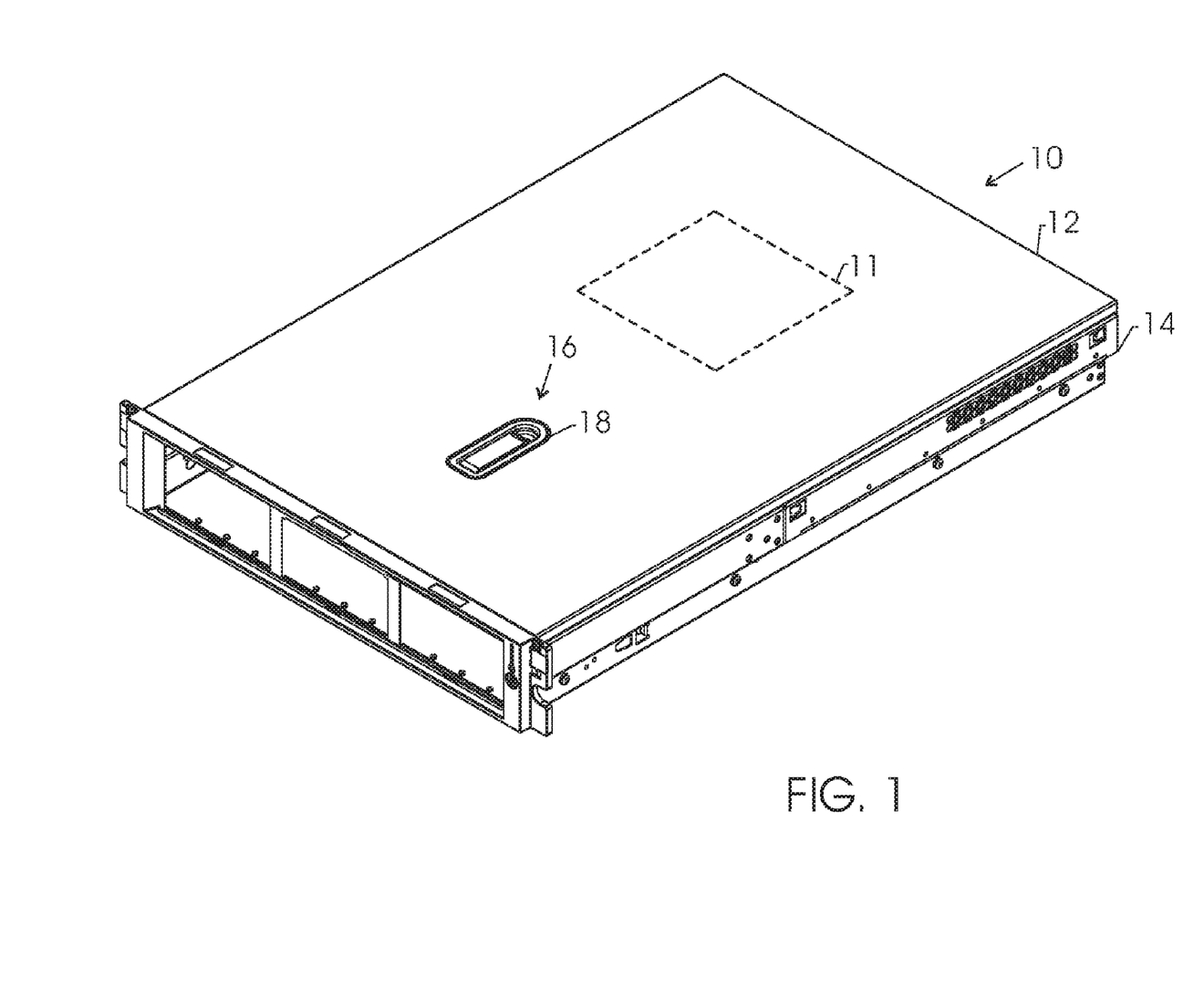
FIG. 1 is a perspective view of a device having a latch assist mechanism in accordance with certain embodiments of the present invention.

FIG. 1 is a perspective view of a device 10 in accordance with certain embodiments of the present invention. The device 10 may comprise a variety of electronics and components, such as a desktop computer system, a rack mount computer system, a portable computer system, a peripheral device, a network device, a server, and so forth. As illustrated, the device 10 comprises an access hood or cover 12 removably coupled to a housing 14. The device 10 also includes computing components, e.g., component 11, disposed inside the housing 14. If internal access is desired, then a latch assist mechanism 16 may be engaged to facilitate removal of the access or cover 12. The illustrated latch assist mechanism 16 is disposed within a receptacle 18 in the access or cover 12. For example, the latch assist mechanism 16 may be snap-fitted or otherwise removably disposed within the receptacle 18, such that it may be replaced or serviced. As discussed in further detail below, the latch assist mechanism 16 provides leverage to facilitate engagement and disengagement of a slidable interlock between the access hood or cover 12 and a housing 14. Accordingly, the access or cover 12 may be attached or removed without tools and with relatively less physical force or exertion by the user. It should be noted that the latch assist mechanism 16 may be configured for user-engagement or for automated engagement, such as by a motorized leverage mechanism and a control system.

Figure 2:
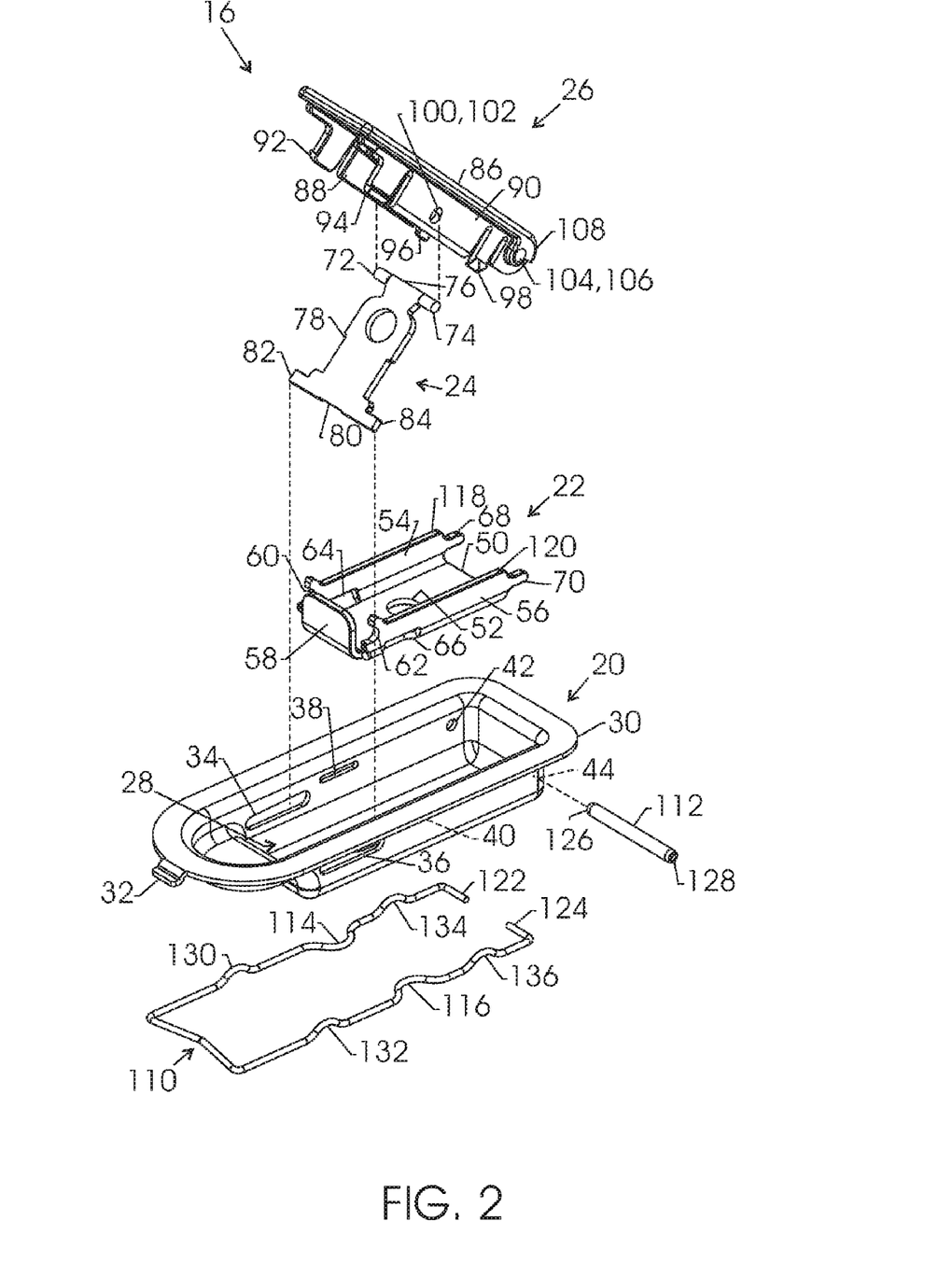
FIG. 2 is an exploded perspective view of an embodiment of the latch assist mechanism illustrated in FIG. 1.
Figure 3:
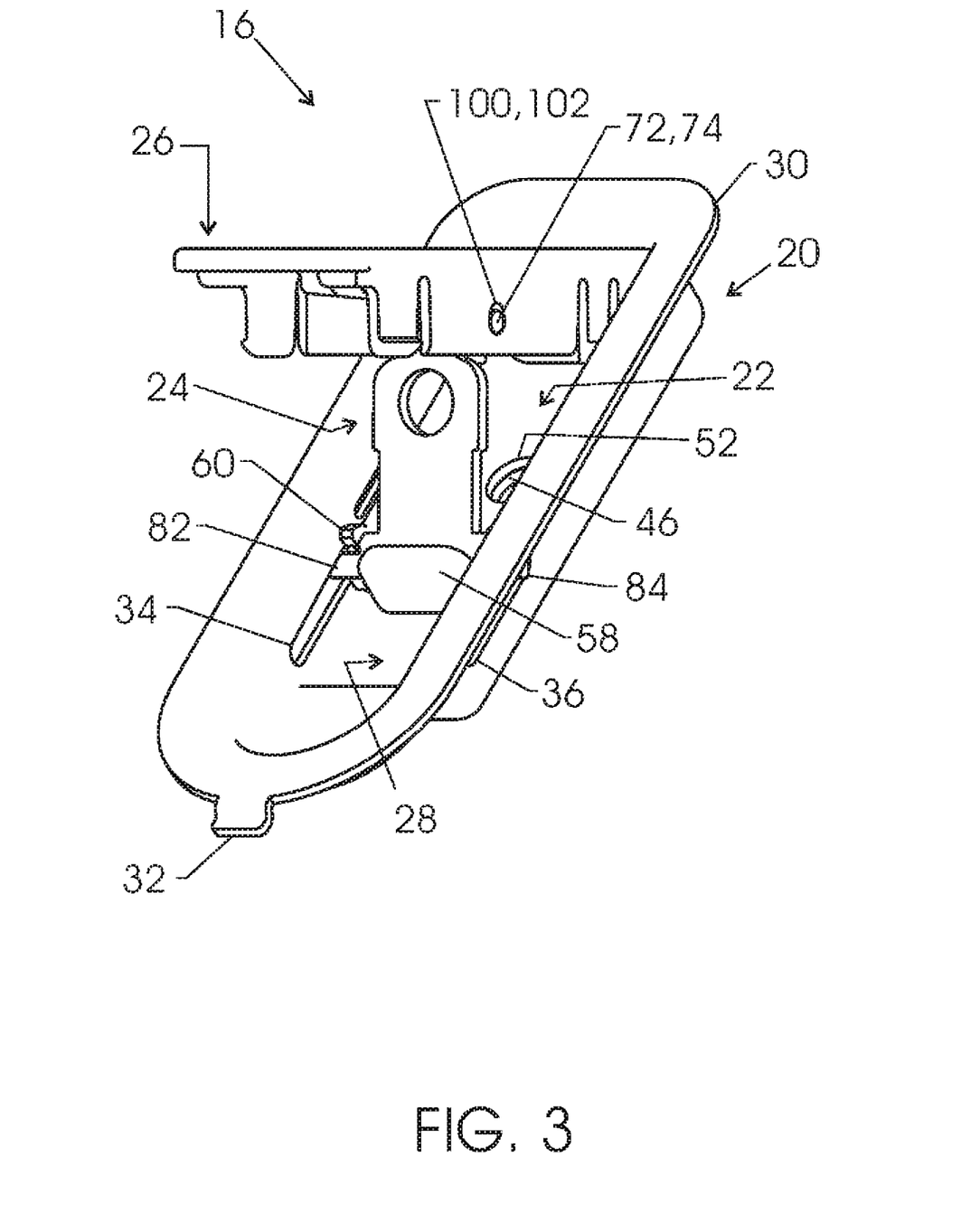
FIG. 3 is an assembled perspective view of the latch assist mechanism illustrated in FIG. 2.
Figure 6:
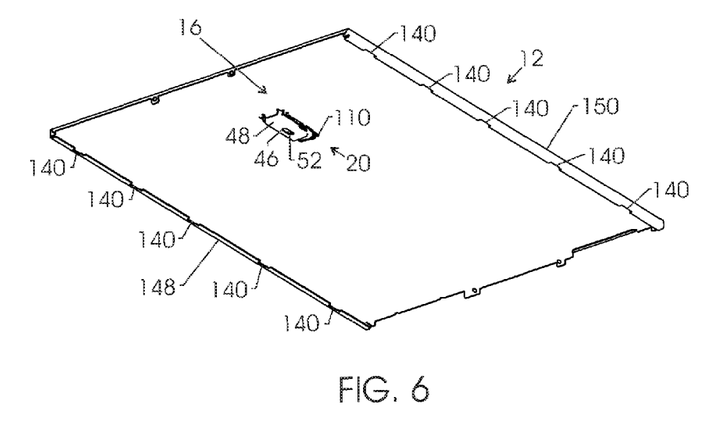
FIG. 6 is a bottom perspective view of an embodiment of the access hood or cover illustrating latch slots in the cover and a longitudinal slot and biasing receptacle in the latch assist mechanism.

FIGS. 2 and 3 are perspective views further illustrating the latch assist mechanism 16 of FIG. 1. As illustrated in the exploded view of FIG. 2, the latch assist mechanism 16 comprises an open ended housing or cup 20, a slidable member or sled 22, an intermediate arm 24, and a leverage member or arm 26. The illustrated cup 20 comprises a recessed portion 28, an upper lip or perimeter rim 30, a forward tab or catch member 32, a pair of longitudinal slots 34 and 36, a pair of retainer receptacles 38 and 40, and a pair of rotational pin receptacles 42 and 44. The cup 20 also comprises a longitudinal slot 46 extending along a base 48 of the recessed portion 28, as illustrated in FIGS. 2 and 6.

As illustrated in FIG. 2, the slidable member or sled 22 comprises a base 50 having a biasing receptacle or hole 52, opposite sides 54 and 56 extending up from the base 50, and an end wall or tab 58 extending upwardly from the base 50. Adjacent the end wall 58, the slidable member or sled 22 also comprises a pair of notches 60 and 62 disposed in the opposite sides 54 and 56, respectively. In addition, the opposite sides 54 and 56 of the slidable member or sled 22 comprise a pair of latch receptacles 64 and 66 and a pair of latch tabs 68 and 70, respectively.

The intermediate arm 24 comprises a pair of rotational members or pivot pins 72 and 74 disposed at one end 76 of the panel 78. At an opposite end 80 of the panel 78, the intermediate arm 24 comprises a pair of rotational members or pivot tabs 82 and 84. As illustrated in FIGS. 2 and 3, the intermediate arm 24 is collapsible between the slidable member or sled 22 and the leverage member or arm 26, such that the latch assist mechanism 16 is collapsible into a relatively low-profile form.

As further illustrated in FIG. 2, the leverage member or arm 26 comprises a top panel 86 and opposite sides 88 and 90. At the opposite sides 88 and 90, the leverage member or arm 26 comprises a pair of snap fit members or tabs 92 and 94 and a pair of snap fit members or tabs 96 and 98. Extending through the opposite sides 88 and 90, the leverage member or arm 26 comprises a pair of intermediate receptacles or arm joints 100 and 102 and a pair of end receptacles or cup joints 104 and 106 disposed at an end 108. The latch assist mechanism 16 also comprises a retainer 110 and rotational member or pin 112 to facilitate a self-contained assembly of the cup 20, the sled 22, the intermediate arm 24, and the arm 26.

In assembly, the recessed portion 28 of the cup 20 movably supports the sled 22 along a longitudinal path. The sled 22 rotatably supports the pivot tabs 82 and 84 of the intermediate arm 24 between the notches 60 and 62 and the end wall 58. The leverage member or arm 26 rotatably supports the pivot pins 72 and 74 of the intermediate arm 24 in the arm joints 100 and 102. The pin 112 rotatably couples the arm 26 with the cup 20 by extension through the receptacles 42 and 44 and the cup joints 104 and 106. The retainer 110 vertically retains the sled 22 within the recessed portion 28 of the cup 20 by insertion of inwardly extending portions 114 and 116 into the retainer receptacles 38 and 40 over upper edges 118 and 120 of the opposite sides 54 and 56. The retainer 110 also retains the pin 112 within the receptacles 42 and 44 and the cup joints 104 and 106 by insertion of end pins 122 and 124 into the end receptacles 126 and 128 of the pin 112.

The retainer 110 also comprises upwardly extending portions 130, 132, 134, and 136, which create a biasing forced upwardly against the rim 30. For example, the retainer 110 may be relatively springy, such that the upwardly extending portions 130, 132, 134, and 136 create a spring-force against the rim 30. Accordingly, if the cup 20 is lowered into the receptacle 18 at a topside of the access hood or cover 12, then the retainer 110 may be engaged with the cup 20 at an underside of the cover 12 such that the upwardly extending portions 130, 132, 134, and 136 springably bias and retain the cup 20 within the receptacle 18. It also should be noted that the tab or catch member 32 of the cup 20 may be extended under a portion of the access hood or cover 12 within the receptacle 18, such that the catch member 32 vertically retains one end of the latch assist mechanism 16 within the cover 12.

As illustrated in the assembled view of FIG. 3, the sled 22, the intermediate arm 24, and the leverage member or arm 26 are all self-contained within the open ended housing or cup 20. It also should be noted that the latch assist mechanism 16 has a relatively low-profile attributed to the low-profile geometry of each respective component, i.e., the cup 20, the sled 22, the intermediate arm 24, and the leverage member or arm 26. The low-profile of the latch assist mechanism 16 also may be attributed to the collapsible configuration of the sled 22, the intermediate arm 24, and the leverage member or arm 26. This self-contained and low-profile assembly of the latch assist mechanism 16 may be achieved without any tools or tool-based fasteners. Instead, the components of the latch assist mechanism 16 are all intercoupled via tool-free mechanisms, such as latches, pins, retainers, snap-fit mechanisms, and so forth. In alternative embodiments, other tool-based and tool-free couplings and joints may be employed in the latch assist mechanism 16. In addition, although illustrated in an open position, a closed position of the leverage member or arm 26 engages the snap fit members or tabs 92-94 and 96-98 with latch receptacles 64-66 and latch tabs 68-70, respectively, thereby releasably retaining the arm 26 within the cup 20.

Figure 4:
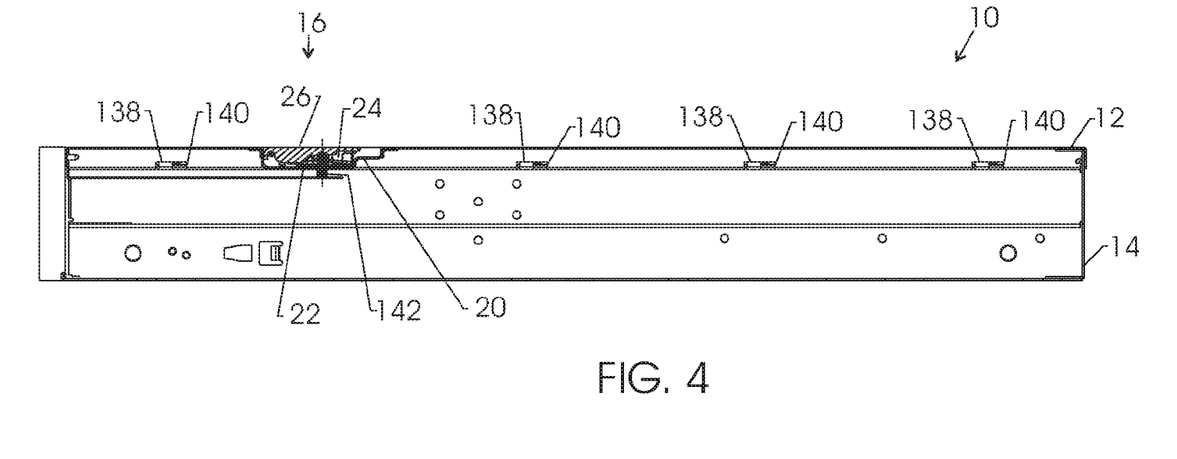
FIG. 4 is a cross-sectional side view of an embodiment of the device illustrating an access hood or cover tool-lessly coupled to a housing.
Figure 5:
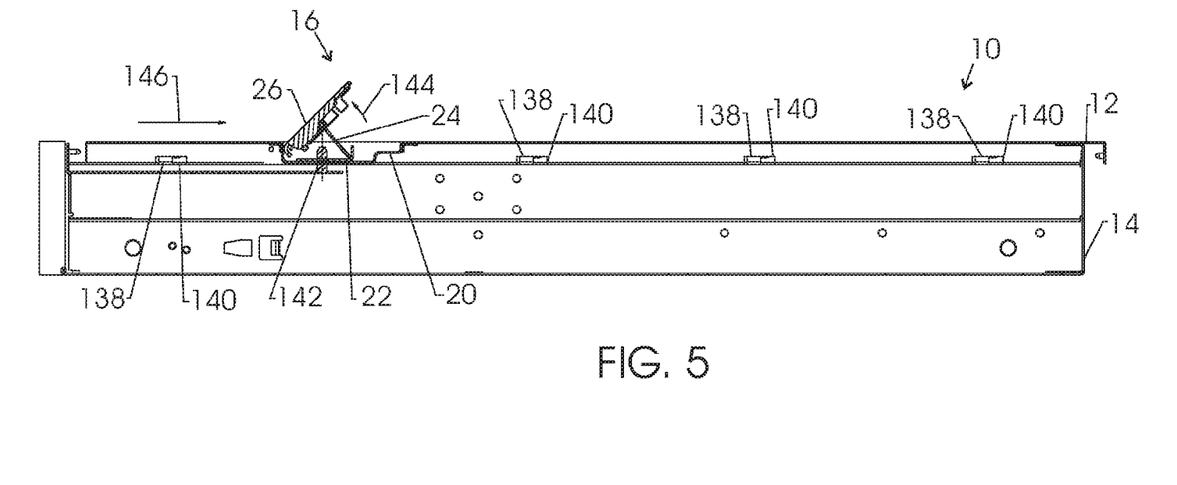
FIG. 5 is a cross-sectional side view of the device of FIG. 4 illustrating the access hood or cover disengaged from the housing via the latch assist mechanism.

FIGS. 4 and 5 are cross-sectional side views of the device 10 illustrating tool-less engagement and disengagement of the access hood or cover 12 with the housing 14. As illustrated in FIG. 4, the access hood or cover 12 is removably coupled to the housing 14 via a plurality of hooks or latches 138 interlocked with mating receptacles or slots 140. The illustrated latches 138 are interlocked with the slots 140 by sliding engagement of the access hood or cover 12 along the top length of the housing 14, i.e., in a leftward direction. A reverse motion, i.e., a rightward movement of the access hood or cover 12, unlocks the latches 138 from the slots 140. In the illustrated embodiment, the latch assist mechanism 16 provides leverage to facilitate the foregoing motions during engagement and disengagement of the access hood or cover 12 with the housing 14. Accordingly, the device 10 comprises a static pin or fixed leverage member 142 within the housing 14 in a position beneath the latch assist mechanism 16. This static pin 142 extends upwardly through the longitudinal slot 46 in the cup 20 and into the biasing receptacle 52 in the sled 22, such that movement of the sled 22 within the cup 20 biases or forces the latch assist mechanism 16 and the cover 12 away from the static pin 142. Again, the linear or sliding movement of the sled 22 is leveraged by the arms 24 and 26.

Turning to FIG. 5, the latch assist mechanism 16 facilitates the disengagement of the latches 138 from the slots 140 by rotation of the leverage member or arm 26 outwardly from the cup 20, as indicated by arrow 144. With this rotation 144, the leverage member or arm 26 pulls the intermediate arm 24 inwardly, i.e., to the left, against the static pin 142, thereby creating an equal disengaging movement of the access hood or cover 12 as indicated by arrow 146, i.e., to the right. After sufficient movement of the access or cover 12, the latches 138 disengage from the slots 140, such that the access hood or cover 12 can be removed from the housing 14. In a reverse motion, the access hood or cover 12 can be engaged and interlocked with the housing 14. Accordingly, the latch assist mechanism 16, the static pin 142, and the latches 138, and the slots 140 facilitate tool-free and leveraged attachment and detachment of the access hood or cover 12 with the housing 14.

Figure 7:
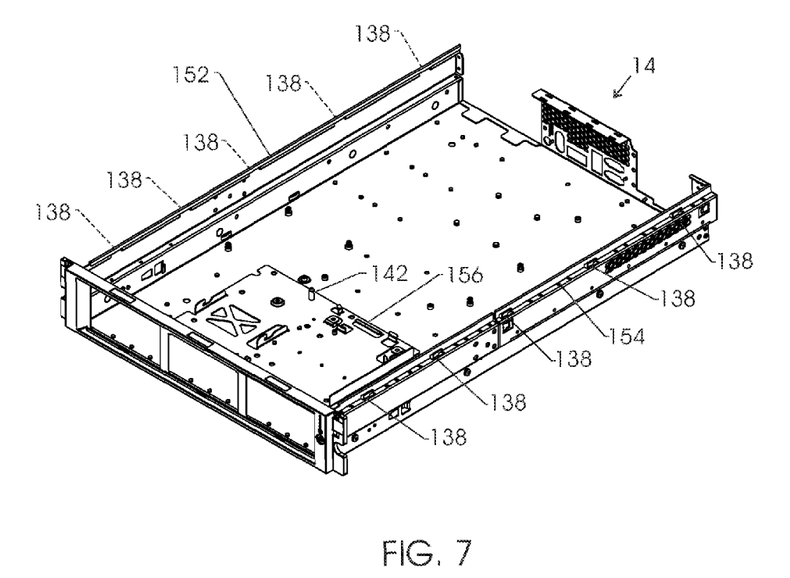
FIG. 7 is a top perspective view of an embodiment of the housing illustrating hood latches and a static pin or fixed biasing member.

FIGS. 6 and 7 are perspective views of the access hood or cover 12 and the housing 14 disassembled from one another. As illustrated, the latch slots 140 are disposed along opposite sides 148 and 150 of the access hood or cover 12, while the hooks or latches 138 are disposed along opposite sides 152 and 154 of the housing 14. FIG. 7 also illustrates the static pin 142 extending outwardly from a structural portion 156 of the housing 14. Although illustrated with latches 138, slots 140, pin 142, and latch assist mechanism 16, other embodiments may employ alternative tool-free interlock mechanisms and leveraging mechanisms to facilitate the foregoing tool-free and leveraged attachment and detachment process. It also should be noted that the illustrated embodiment of the latch assist mechanism 16 as a relatively low profile, thereby facilitating its use in space limited applications.

What is claimed is:

1. A mechanical assist apparatus, comprising:
   a user-engageable lever configured to be mounted on an access cover;
   an arm rotatably coupled to the user-engageable lever at a first joint; and
   a sled rotatably coupled to the arm at a second joint offset from the first joint, wherein the sled comprises a receptacle configured to receive a static member of a housing, and the user-engageable lever is configured to move the receptacle against the static member to cause movement of the access cover relative to the housing.

2. The mechanical assist apparatus of claim 1, wherein the user-engageable lever, the arm, and the sled comprise an integral assembly adapted to mount tool-lessly into the access cover.

3. The mechanical assist apparatus of claim 1, wherein the user-engageable lever, the arm, and the sled are configured to leverage engagement and disengagement of slidable interlock structures disposed on the access cover and the housing.

4. The mechanical assist apparatus of claim 1, wherein the user-engageable lever, the arm, and the sled are self-contained within an open-ended housing.

5. The mechanical assist apparatus of claim 4, wherein the user-engageable lever is rotatable outwardly from the open-ended housing.

6. The mechanical assist apparatus of claim 1, wherein the user-engageable lever, the arm, and the sled have a collapsible low-profile configuration.

7. The mechanical assist apparatus of claim 1, wherein the user-engageable lever is configured to translate the sled via rotation of the arm, and the sled is configured to translate the access cover relative to the housing via leverage between the receptacle and the static member disposed in the housing.

8. A mechanical assist apparatus, comprising:
   a mechanical assist cup configured to mount to an access cover without use of tools;
   a lever disposed in the mechanical assist cup and configured to rotate between a first position generally parallel with the access cover and a second position angled outward from the access cover, wherein rotation of the lever is configured to induce translation of the access cover relative to a housing; and a sled disposed in the mechanical assist cup that comprises a receptacle that receives a static member of the housing and the sled configured to translate along the access cover; and an arm connecting the lever to the sled;

wherein rotation of the lever is configured to induce translation of the sled, and translation of the sled is configured to induce translation of the access cover relative to the housing when the receptacle moves against the static member.

9. The mechanical assist apparatus of claim 8, wherein mechanical assist cup comprises a slot configured to pass the static pin into the receptacle along a path of translation of the sled.

10. The mechanical assist apparatus of claim 8, wherein the mechanical assist cup comprises a snap fit configured to mount the mechanical assist cup to the access cover.

11. A mechanical assist apparatus, comprising:

a user-engageable lever configured to be mounted on an access cover;

an arm rotatably coupled to the user-engageable lever at a first joint; and a sled rotatably coupled to the arm at a second joint offset from the first joint, wherein the sled comprises a receiving hole, the user-engageable lever is configured to translate the sled via rotation of the arm, and the sled is configured to translate the access cover relative to a housing via leverage when the receiving hole is moved against a static member disposed in the housing.

12. The mechanical assist apparatus of claim 11, comprising the housing and access cover.

13. A mechanical assist apparatus, comprising:

a mechanical assist housing configured to mount to an access cover without the use of tools;

a lever disposed in the mechanical assist housing and configured to rotate between a first position generally parallel with the access cover and a second position angled outward from the access cover, wherein rotation of the lever is configured to induce translation of the access cover relative to a housing;

a sled comprising a receptacle;

a slot configured to pass a static member of a housing into the receptacle of the sled;

an arm that defines a first end and a second end, the arm engages the lever on the first end and the sled on the second end; and the sled configured to translate in response to rotation of the lever, wherein the lever is configured to rotate between the fist position and the second position relative to the sled in response to user engage of the lever, the sled is configured to engage the static member within the housing to translate the access cover relative to the housing in response to translation of the sled, and the folded position has the lever generally parallel to the sled.

* * * * *

UNITED STATES PATENT AND TRADEMARK OFFICE
CERTIFICATE OF CORRECTION

PATENT NO. : 7,614,672 B2  Page 1 of 1
APPLICATION NO. : 11/941832
DATED : November 10, 2009
INVENTOR(S) : Kelly K. Smith et al.

It is certified that error appears in the above-identified patent and that said Letters Patent is hereby corrected as shown below:

In column 6, line 22, in Claim 13, delete "fist" and insert -- first --, therefor.

Signed and Sealed this

Thirtieth Day of March, 2010

David J. Kappos
*Director of the United States Patent and Trademark Office*